March 30, 1965 J. M. JACQUE ETAL 3,175,828

PHONOGRAPH PICKUP CARTRIDGE MOUNTING

Filed Sept. 28, 1962

INVENTORS
JAMES M. JACQUE
THEODORE LINDENBERG
BY Francis J. Klempay
ATTORNEY 3,175,828
PHONOGRAPH PICKUP CARTRIDGE MOUNTING
James M. Jacque and Theodore Lindenberg, Conneaut, Ohio, assignors to The Astatic Corporation, Conneaut, Ohio, a corporation of Ohio
Filed Sept. 28, 1962, Ser. No. 226,966
5 Claims. (Cl. 274—24)

This invention relates to phonograph equipment for the reproduction of recorded audio information from record disks and more particularly to improved means for mounting the pickup cartridge of such equipment in its tone arm.

Recent developments in the design of phonograph equipment have followed a course toward smaller stylus tips and desirably toward lighter stylus pressures. The first course has been dictated by a desire to extend the playing time on a given size record and to maintain fidelity of reproduction; and the second course has been dictated by a desire to offset the more stringent operating condition imposed by the first. As stylus size diminishes, the unit loading on the record increases with increased wear of both stylus and record. An obvious first remedy is to reduce stylus force. This was formerly impractical in record changers particularly, where a reasonable force was required to actuate the cycling mechanism. Now, however, this factor has been minimized by the development of more highly refined changers operating satisfactorily at much reduced stylus pressures. For example, it was formerly customary to operate record changers at a stylus pressure in excess of 10 grams, but currently a number of commercial changers are available which operate at a stylus pressure of about 3 grams. This radical reduction in stylus pressure has led to a demand for pickup cartridges exhibiting extremely high dgrees of mechanical compliance and reduced effective stylus mass and the art has been advanced in this respect by the design of such pickup cartridges; for example, those disclosed and claimed in copending applications Serial No. 233,758 filed Oct. 29, 1962, and Serial No. 277,784 filed May 3, 1963, both of which are assigned to the assignee of the present application.

Another aspect of this problem is evident in the marked tendency of lightly biased tone arms (3 grams downward pressure to react adversely to transient excitation derived from shock, bumping, etc., or to repeated vertical shock deriving from warped record disks. This shock excitation is usually of quite low frequency resulting in a tendency of the arm to bounce and to draw the stylus up out of the record groove and even to cause it to skip sidewise at times and thus to jump from groove to groove. A bouncing return of the stylus to the record surface can also result in a damaged record.

Various attempts have been made in the past to provide smaller ancillary arms to pivotally support the pickup cartridge independently in the main pickup arm. These smaller arms have been variously biased with respect to the main arm, by weights and counterweights, or by gravity or by springs, but have generally been incapable of achieving the desired results. We have observed that spring-biased assemblies respond to transient vertical shock by repeatedly rising and falling from the record surface with the attendant generation of an unpleasant warbling sound in the associated speaker. Other prior art devices which relay upon mass distribution and gravitational forces generally display a sluggishness to respond to shock disturbances and to recover therefrom, due to the time required to accelerate the masses involved.

We have discovered that by providing the cartridge support with a balancing mass and by then urging the cartridge into operative position by applying a repelling magnetic force thereto we are able to provide a cartridge mount which overcomes the shortcomings of known prior art devices.

It is accordingly a prime object of this invention to provide a novel magnetically biased mounting method for phonograph cartridges.

Another object of the invention is the provision of mass balanced means for supporting a pickup cartridge in a tone arm and of adding to said mass balance a biasing force derived from two magnets of opposing like polarity.

A further object is the provision of means for making a pickup cartridge readily retractable from its playing position so that it will not display objectionable resistance to motion under shock excitation.

A still further object of the invention is the provision of means for permitting a pickup cartridge to track its associated record at extremely light operating pressures while yet being free to retract under externally applied forces so that it cannot damage said record.

Yet a further object of the invention is the provision of means for applying to a pivotally supported pickup cartridge a biasing force which varies in strength with the relative position of said cartridge in its supporting arm.

Those and other objects and advantages of the invention will become apparent upon consideration of the following specification and accompanying drawing wherein there are disclosed several preferred embodiments of our invention.

Figure 1:
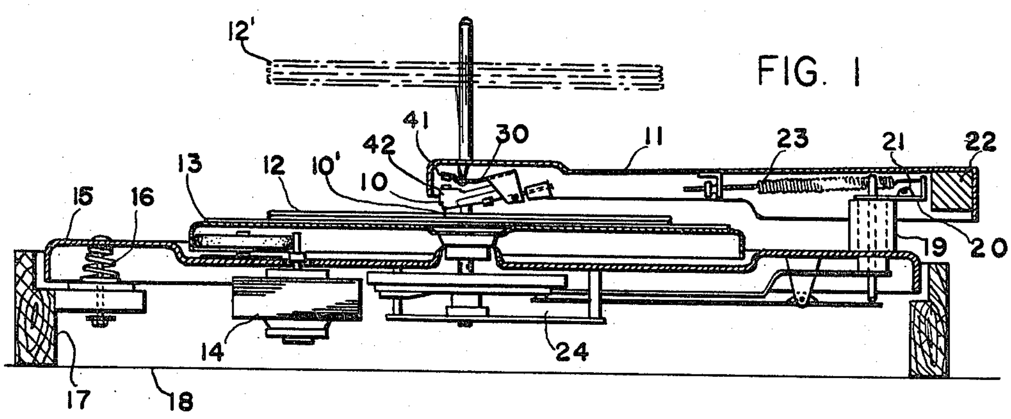
FIGURE 1 is a sectional view of a record changer in which is mounted the cartridge support means of the invention.

Referring first to FIGURE 1 of the drawing, reference numeral 10 indicates a phonograph pickup cartridge which is supported in a tone arm 11 for swinging motion over the top surface of a record disk 12. Pickup cartridge 10 is equipped with a stylus 10′ whose two functions are to engage the groove of a phonograph record and thus to transmit the vibrations of the groove to the transducer within the cartridge and to guide the arm 11 over the surface of record disk 12. Disk 12 rests upon a turntable 13 which is caused to rotate upon actuation of motor 14. The tone arm 11, the turntable 13 and the motor 14 are suitably supported on a formed metal base plate 15 as is well known in the art. Base plate 15 may customarily be supported upon a plurality of coil springs 16, one of which is shown, inside a frame 17 to support the entire changer assembly in operative position on a suitable table 18.

Tone arm 11 is supported in operative position above base plate 15 by a vertically disposed tubular support 19 and is free to swing laterally over the turntable 13 about the axis of support 19. A horizontally offset bracket 20 holds a horizontal pivot pin 21 which in turn pivots the tone arm 11 for vertical swinging motion about pin 21. Tone arm 11 is normally urged downward toward record disck 12 by force of gravity. The mass of arm 11 and its supported cartridge 10 are balanced by a counterweight 22 if necessary, and an adjusted downward pressure on cartridge 10 is finally applied by proper adjustment of tension on a coil spring 23. An assembly of well known cams, gears and levers, indicated generally by reference numeral 24, is associated with the motor 14 to provide suitably sequenced actions in the several parts of the changer assembly as is well known in the art.

In the normal operation of record changers of the kind here under discussion, it is customary to have the changer mechanism execute substantially the following sequences. First, turntable 13 is started rotating at selected speed. Second, tone arm 11 is swung laterally outward away from turntable 13 and a record disk is allowed to drop from stack 12' downwardly to the surface of turntable 13. Third, tone arm 11 is swung laterally inward until cartridge 10 is over the beginning edge of record 12. Fourth, tone arm 11 is lowered about axis 21 until stylus 10' bears upon the upper surface of record 12. Fifth, cams and gears 24 completely disengage from tone arm 11, the latter is free of any mechanical restraint from the changing mechanism and, playing of the surface of disk 12 proceeds.

Figure 2:
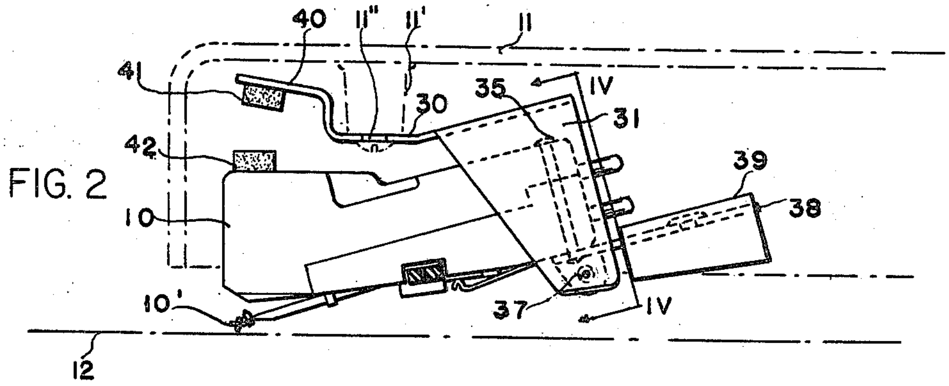
FIGURE 2 is an enlarged side elevation of the cartridge mounting assembly of FIGURE 1.

It is during this last described playing cycle that the mechanism of the present invention exercises its intended functions. Reference is made to FIGURE 2 for a detailed description of one preferred embodiment of the invention.

The tone arm 11, described above, is shown in broken lines in FIGURE 2. It is customary to provide such tone arms with suitable mounting bosses 11', one of which is shown, and prior art use dictates mounting a pickup cartridge securely to bosses 11'. In carrying out our invention we secure to the mounting bosses 11', by means of screws 11'' for example, a formed metal bracket 30. Bracket 30 extends rearwardly of boss 11' and has a pair of spaced downwardly directed flanges 31 formed integrally therewith. Flanges 31 are spaced sufficiently to embrace the body of cartridge 10 without touching the same and may conveniently be flared outwardly at their lower ends as at 31'. Near the lower ends of flanges 31 we provide a pair of aligned pierced holes 32.

An inverted U-shaped bracket 34 is attached to cartridge 10 at the rear end thereof by means of a tubular rivet 35, for example. The depending legs 36 of bracket 34 are each provided with outwardly extending pivot studs 37. Studs 37 are pivotally received in holes 32 to secure the cartridge 10 hingedly to bracket 30 between the flanges 31 thereof. Extending rearwardly of bracket 34, we provide an arm 38 to which we secure a counterweight 39.

Formed integrally with bracket 30 and extending forwardly of bosses 11' so as to overlie the front end of cartridge 10, we provide an upwardly offset extension 40. To the underside of extension 40, an upper magnet 41 is secured by cementing, for example. Immediately below the upper magnet 41, and secured to the top face of cartridge 10, a lower magnet 42 is provided. Both of the magnets 41 and 42 may conveniently be made of sintered ceramic ferro-magnetic material or of suitable metallic magnet material such as Alnico, for example.

In selecting and orienting the magnets 41 and 42 it is important to note that they are of substantially identical size and shape and strength and that they are arranged with their similar magnetic poles confronting each other. That is to say, the north magnetic pole of magnet 41 must be in aligned and confronting relation with the north magnetic pole of magnet 42 and the south magnetic pole of magnet 41 must be in aligned and confronting relation with the south magnetic pole of magnet 42. When arranged in this preferred manner the magnets 41 and 42 will repel, rather than attract, each other in observance of known magnetic laws.

Figure 3:
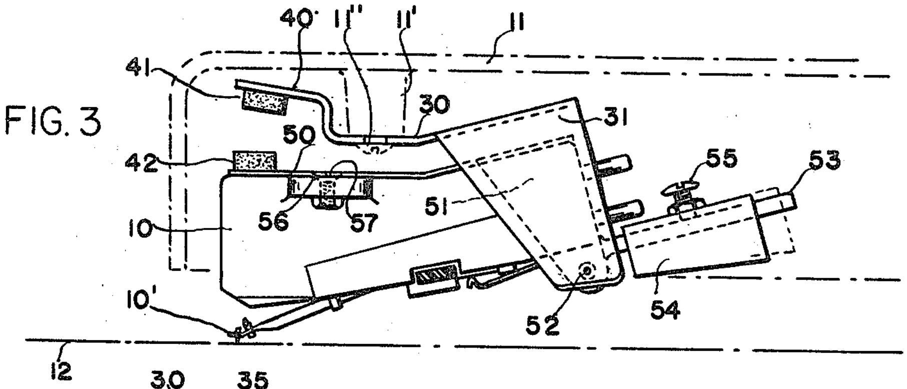
FIGURE 3 is an enlarged side elevation of a modification of our invention.
Figure 4:
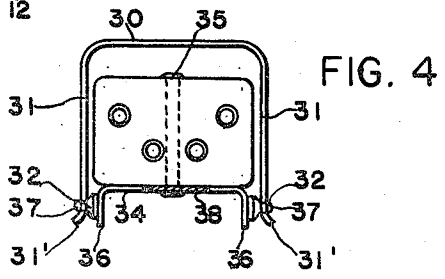
FIGURE 4 is a sectional view taken at line IV—IV of FIGURE 2.

The above described features may be embodied in a modification as illustrated in FIGURE 3 of the drawing. In the embodiment of FIGURE 3, we provide a saddle-like metal bracket 50 which underlies mounting bracket 30 in the manner shown. Extending downwardly from bracket 50 and lying generally parallel with flanges 31 of bracket 30, we provide a pair of inner flanges 51. Attached to the lower extremities of flanges 51 we provide a pair of outwardly directed pivot studs 52 which are adapted to be pivotally received in the holes 32 of outer bracket 30. Thus the inner bracket 50 is hingedly secured to bracket 30. Extending rearwardly of, and attached to at least one of the flanges 51, we provide an arm 53 which supports an adjustable weight 54. Weight 54 may be held in a selected position by a screw 55, for example.

The lower magnet 42 is attached securely to the upper side of the forwardly extending portion of bracket 50 so that it underlies the upper magnet 41. In the flat mid-portion of bracket 50, we provide a pair of holes 56, one of which is shown, to receive fastening means such as machine screw 57. Thus we are able to attach any one of a number of well known pickup cartridges to the novel mounting device of our invention and to change such cartridges from time to time as desired without impairing the operative portion of the mounting.

In operation, the device of this invention is arranged and adjusted in the following manner to accomplish the results desired. The pickup cartridge 10 is mounted on either the U-shaped bracket 34 (in the case of permanent assembly per FIG. 2) or on the saddle-like bracket 50 (in the case of a changeable assembly per FIG. 3). The bracket 34 or 50, as the case may be, is pivoted to the flanges 31 of bracket 30. Bracket 30 is secured to the mounting bosses 11' of the tone arm 11. With a record disk 12 on the turntable 13, the arm 11 is swung inwardly and the stylus 10' of cartridge 10 is rested on the surface of record 12. The downward pressure of the arm 11 is adjusted by changing the tension of spring 23 to the recommended amount (ideally about 3 grams in modern practice) for the changer being used. At this time the cartridge 10 will assume a substantially level attitude about at the position shown in FIGURES 2 and 3, for the following reasons. The combined mass of the cartridge 10 and the magnet 42 are substantially balanced by the mass of the counterweight 38. The repelling force tending to separate the magnets 41 and 42 is selected to be just equal to the downward force (3 grams in this case) applied to the cartridge 10 by the tone arm 11. Thus under normal 3 gram loading, the magnetic repulsion between magnets 41 and 42 will produce an upwardly directed sustaining force of precisely 3 grams against tone arm 11 and the magnets 41 and 42 will maintain themselves spaced by about ⅜'', while the cartridge 10 stays substantially level.

The same set of weight and force parameters governs the assembly shown in FIGURE 3, the only difference being that the counterweight 54 is made adjustable on arm 53 to bring the combined mass of cartridge 10 and magnet 42 into initial balance about pivot studs 52 and thus to permit efficient operation of the invention with any one of a variety of cartridges in place on bracket 50.

Under normal operating conditions the pickup cartridge 10 will ride perfectly level over the surface of record 12 and stylus 10' will maintain contact with record 12 under established 3 gram loading. Upon transient vertical shock excitation such, for example, as might be generated by heavy jumping or dancing on a residence floor, any tendency of arm 11 to move toward the record 12 is resisted by the constantly increasing force generated between magnets 41 and 42 as they are urged toward each other. A non-linear cushioning effect is thus achieved. Following any downward shock on arm 11 there will be a return upward motion enforced by the now increased repulsion between magnets 41 and 42. If this return force were linear, as it is in the spring mounted devices of prior art, there would be a marked tendency for the arm to "overshoot" its normal position and to drag the cartridge up with it. This is believed to cause the undesirable warbling effect which has been observed in tests of spring mounted devices of prior art. The "overshooting" thus observed may at times completely dislodge the stylus from the record groove.

In the device of the present invention the return forces here under discussion will be seen to diminish as the arm 11 returns to its normal position, since the repelling forces between magnets 41 and 42 are progressively and automatically diminishing at a non-linear rate as the magnets move away from each other. This appears to permit arm 11 to "settle down" after only a single oscillation or so and to greatly diminish any tendency of the assembled parts to vibrate vertically. We believe this damping or settling function is derived from the non-linear decrement exhibited by our magnetic device as opposed to the linear decrement to be found in a spring biased system.

In an effort to assign numerical values to the magnitudes of the effects observed we have noted that when one typical assembly of magnets and cartridge was measured, it displayed a three gram force when the magnets were three-eighths of an inch apart, and a force of over seventeen grams when they were moved tightly together. One spring biased device was also measured and it was noted that, while the spring was compressed to the same three-eights spacing as above a three gram force was recorded, but, when the spring was completely compressed the measured force was only seven grams. It is thus clearly evident that the magnetic device of the present invention displays a resistance to displacement ratio aspect which is much greater that that of prior art spring loaded devices.

The non-linear increase of resistance with increasing displacement described above is reflected in much increased frictional forces in the pivot joints 37 and thus the entire system displays a greater degree of mechanical damping against continued oscillation from shock excitation than an equivalent system using spring biasing or loading.

The device of the present invention exhibits similar beneficial functions, but of lesser magnitude, in the face of shock excitation applied laterally of the record surface. Due to the fact that the side walls of a record groove are disposed at an angle of forty-five degrees with respect to the top surface of the record and the only point of contact between the groove wall and the pickup is through the tip of the stylus 10′, it will be evident that any lateral shock applied to the record player or the tone arm in a direction transverse to the groove, will result in an upward shock directed at lifting the stylus upward out of its groove. If, while the stylus is free of the groove, the lateral shock simultaneously impels the cartridge and its supporting tone arm laterally of the groove, then sidewise groove jumping occurs and several grooves may be skipped before the cartridge again settles down. By virtue of the fact that our cartridge mounting device applies increasing downward force to the cartridge in opposition to any vertical motion thereof, the tendency is to keep the stylus in contact with the groove even in the face of lateral shock forces which would dislodge a conventionally mounted cartridge. This effect is limited however to harmlessly absorbing only that initial portion of a lateral shock which results in a vertical component of stylus motion equal to the depth of the record groove. Beyond that our magnetic device is powerless to offset lateral forces.

We have thus described our novel cartridge mount in such particularity that it will be evident we have provided a mechanism which accomplishes the objects initially set forth. Means are provided for magnetically biasing a pickup cartridge into operative engagement with a phonograph record through the repelling arrangement of magnets 41 and 42. This biasing force is made progressively greater as the cartridge moves farther from its normal position. The cartridge is free to retract into the tone arm under shock excitation but the resistance to such retraction increases at a rate greater than the rate of the applied excitation. Conversely, the impelling return forces tending to restore the cartridge to its normal position diminish as the cartridge approaches said normal position.

Many modifications may be made in practising this invention without departing from the spirit thereof. Reference should therefore be had to the appended claims in determining the scope of the invention.

We claim:

1. In an electric phonograph tone arm assembly for use with flat record disks and adapted to be mounted for swinging movement about vertical and horizontal axes whereby the free end of the arm which carries the pickup cartridge may have tracking movement across the face of the record and be capable of exerting a predetermined downward force on the stylus of the cartridge, the improvement comprising means movably mounting said cartridge on the free end portion of said arm whereby said stylus may have vertical movement with respect to said free end portion, a first permanent magnet affixed to said arm, and a second permanent magnet affixed to said cartridge in alignment with and in magnetic opposition to said first magnet to thereby yieldingly retain said free end portion of said arm at a predetermined elevation with respect to said stylus when the stylus is resting in a record groove, the arrangement being such that the repulsion force exerted by said magnets maintains a floating relation between said stylus and said free end portion of the arm and said force increasing nonlinearly upon vertical movement of said stylus upwardly with respect to said free end portion of said arm.

2. Apparatus according to claim 1 further characterized in that said means movably mounting said cartridge comprises a bracket adapted to be secured to the free end portion of said arm, means pivotally interconnecting said cartridge and said bracket for pivotal movement of said cartridge about a horizontal axis, and the stylus of said cartridge being horizontally offset from the axis of said pivotal interconnection.

3. Apparatus according to claim 2 further characterized in that the first of said magnets is carried by said bracket and the second of said magnets is carried by said cartridge at a point offset from said axis of pivotal interconnection.

4. Apparatus according to claim 2 further including an adjustable counterweight carried by said cartridge and positioned on the opposite side of said axis of pivotal interconnection from the stylus of the cartridge.

5. Apparatus according to claim 1 further characterized in that said means movably mounting said cartridge comprises an elongated bracket adapted to be mounted horizontally and longitudinally in the outer free end of the tone arm, said bracket carrying said first magnet at its outer end and having a pair of spaced depending flanges at its inner end, each flange being flared outwardly in a lateral direction at its lower end and having an aperture above its flared out portion, and a pair of pintle pins carried by said cartridge and received in said apertures to provide a pivotal interconnection between said cartridge and bracket.

References Cited by the Examiner

UNITED STATES PATENTS

| | | | |
|---|---|---|---|
| 2,489,062 | 11/49 | Thompson | 274—24 |
| 2,643,886 | 6/53 | DiGhilini et al. | 274—24 |
| 2,667,895 | 2/54 | Pool | 137—528 |
| 2,934,610 | 4/60 | Dieter | 274—37 |
| 2,954,234 | 9/60 | Marks | 274—23 |
| 2,983,516 | 5/61 | Bauer et al. | 274—23 |

FOREIGN PATENTS

| | | |
|---|---|---|
| 1,119,536 | 12/61 | Germany. |

NORTON ANSHER, *Primary Examiner.*